(12) United States Patent
Duch et al.

(10) Patent No.: US 8,905,641 B2
(45) Date of Patent: Dec. 9, 2014

(54) HUB BEARING ASSEMBLY WITH A SEALING DEVICE

(71) Applicants: Daniele Duch, San Gillio (IT); Fausto Morello, Sommariva del Bosco (IT); Andrea Serafini, Pinerolo (IT)

(72) Inventors: Daniele Duch, San Gillio (IT); Fausto Morello, Sommariva del Bosco (IT); Andrea Serafini, Pinerolo (IT)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/936,521

(22) Filed: Jul. 8, 2013

(65) Prior Publication Data

US 2014/0037239 A1  Feb. 6, 2014

(30) Foreign Application Priority Data

Jul. 9, 2012  (IT) .......................... TO2012A000604

(51) Int. Cl.
| | |
|---|---|
| *F16C 33/76* | (2006.01) |
| *F16C 33/80* | (2006.01) |
| *B60B 27/00* | (2006.01) |
| *F16J 15/34* | (2006.01) |
| *F16C 33/78* | (2006.01) |
| *F16J 15/32* | (2006.01) |
| *F16C 19/18* | (2006.01) |

(52) U.S. Cl.
CPC ........... *B60B 27/0073* (2013.01); *F16C 19/186* (2013.01); *F16J 15/3456* (2013.01); *F16C 2326/02* (2013.01); *F16C 33/7826* (2013.01); *F16C 33/805* (2013.01); *F16J 15/3232* (2013.01); *F16C 33/7886* (2013.01)
USPC .......................................... 384/480; 384/486

(58) Field of Classification Search
CPC ............. F16C 33/7823; F16C 33/7853; F16C 33/7866; F16C 33/7876; F16C 33/80; F16C 33/805; B60B 27/0073
USPC .......... 384/477, 480, 484, 485, 486; 277/346, 277/350, 412, 418, 551, 562
See application file for complete search history.

(56) References Cited

FOREIGN PATENT DOCUMENTS

| | | | |
|---|---|---|---|
| EP | 286151 A2 | * | 10/1988 |
| EP | 0286151 A2 | | 10/1988 |
| EP | 1128078 A2 | | 8/2001 |
| EP | 1803948 A1 | | 7/2007 |
| GB | 2089906 A | | 6/1982 |
| JP | 62010103 U | | 1/1987 |
| JP | 2006037978 A | | 2/2006 |
| JP | 2009222183 A | | 10/2009 |
| JP | 2010065800 A | | 3/2010 |
| JP | 2010106925 A | | 5/2010 |
| JP | 2011069419 A | * | 4/2011 |
| JP | 2011080570 A | * | 4/2011 |
| JP | 2011080575 A | * | 4/2011 |
| WO | 2012/107118 A1 | | 2/2012 |
| WO | 2012/019803 A1 | | 8/2012 |

* cited by examiner

*Primary Examiner* — Phillip A Johnson
(74) *Attorney, Agent, or Firm* — Bryan Peckjian; SKF USA Inc. Patent Department

(57) ABSTRACT

A hub bearing assembly (10) is provided with a stationary outer ring (20), an inner ring (30) with a flange (32) for mounting of a wheel, the flange (32) forming an annular relief (36) that protrudes in an axially inner direction and has an inner cylindrical surface (37); a sealing device (50), mounted on the outer ring (20), has a non-contacting axial lip (61) which extends towards the flange (32) and has a free end portion (62) which provides a labyrinth seal with the cylindrical surface (37) of the annular relief (36).

9 Claims, 5 Drawing Sheets

US 8,905,641 B2

HUB BEARING ASSEMBLY WITH A SEALING DEVICE

CROSS-REFERENCE TO RELATED APPLICATIONS

This application claims priority to Italian patent application no. TO2012A000604 filed on Jul. 9, 2012, the contents of which are fully incorporated herein by reference.

FIELD OF THE INVENTION

The present invention relates to a hub bearing assembly provided with a sealing device. More particularly, the assembly has an axis of rotation and serves to rotatably mount a vehicle wheel to a suspension of the vehicle.

BACKGROUND OF THE INVENTION

Bearing assemblies are known, for example, from EP 0 286 151 A2, EP 1 128 078 A2, EP 1 803 948 A1.

A hub bearing assembly, in which a sealing device is associated with a rotating shield or slinger mounted on the rolling ring, is disclosed in WO 2012/019803 A1.

In general, the automotive industry has to meet a growing demand in terms of reduced fuel consumption and exhaust emissions.

The present invention aims to provide a hub bearing assembly equipped with a sealing device which, on the one hand, ensures a high level of hermetic seal, and, simultaneously, leads to a reduction of the friction torque caused by the seal when the rings of the assembly are in relative rotation. It is also desired to reduce manufacturing costs and the number of components of the assembly.

SUMMARY OF THE INVENTION

The above and other objects and advantages are achieved, according to the invention, by a hub bearing assembly for rotatably mounting a wheel to a vehicle, the assembly having an axis of rotation (x) and comprising a radially outer, stationary bearing ring (20); a radially inner bearing ring (30), which is rotatable about the axis of rotation and provides a flange (32) extending in a radially outer direction for mounting a wheel; a plurality of rolling elements (40) interposed between the outer (20) and inner (30) rings; a sealing device (50), mounted to the outer ring (20) and having a plurality of elastomeric sealing lips extending towards the inner ring (30); wherein the flange (32) forms an annular relief (36) projecting in an axially inner direction and providing a radially inner, cylindrical or frustoconical surface (37), facing the axis of rotation (x), and that at least one of the elastomeric sealing lips of the sealing device (50) is a non-contacting axial lip (61) which extends axially towards the flange (32) and provides a free end portion (62) which performs a labyrinth seal, without contact, with the radially inner surface (37) of the annular relief (36).

BRIEF DESCRIPTION OF THE DRAWINGS

A few preferred, but not limiting, embodiments of a hub bearing assembly according to the invention will now be described, reference is made to the accompanying drawings, in which.

DETAILED DESCRIPTION OF THE INVENTION

Figure 1:
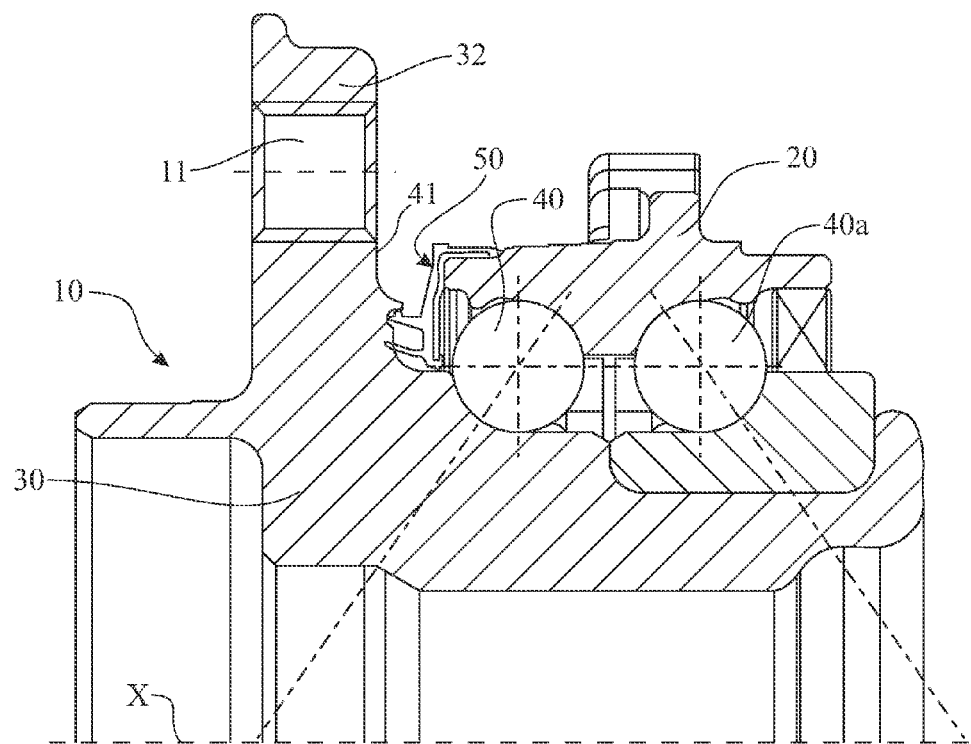
FIG. 1 is a partial view, in axial cross-section, of a first embodiment of a hub bearing assembly with a sealing device.
Figure 2:
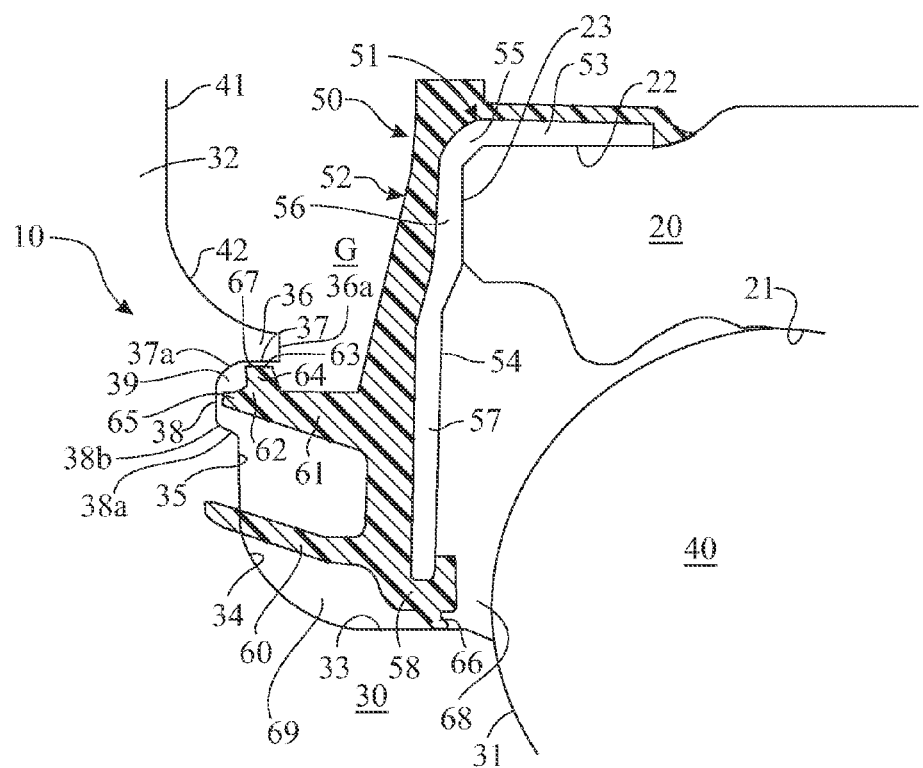
FIG. 2 is a view in enlarged scale of a part of the assembly of FIG. 1.

Referring initially to FIGS. 1 and 2, a hub bearing assembly, indicated in its entirety at 10, is intended to rotatably mount a wheel (not shown) to a vehicle. The assembly 10 has a central axis of rotation x and comprises an outer bearing ring 20, an inner bearing ring 30, and a plurality of rolling elements 40, in this example balls, which are interposed between the outer ring 20 and the inner ring 30. The outer ring 20 is a stationary ring which is fixed to the vehicle suspension and provides at least one radially outer raceway 21 formed on a radially inner surface of the ring. Throughout the present description and claims, terms and expressions indicating positions and directions, such as "radial" and "axial", are to be understood as referring to the axis of rotation x of the hub bearing assembly.

The inner ring 30 is a rotating ring, which has a radially inner raceway 31 arranged in a coaxially inner position with respect to the raceway 21. The inner ring 30 forms a flange 32 which extends radially outwardly from the outboard side, i.e. from the axially outer side of the vehicle. The flange 32 is provided with connection means 11 allowing to mount the vehicle wheel. Typically, the connection means may comprise a plurality of threaded holes 11 formed axially through the flange to accommodate respective wheel fastening bolts. The hub bearing assembly, shown only partially in the drawings, typically includes two rows of rolling elements 40 and 40a, according to a per se known arrangement, which need not be described here in greater detail.

Between the flange 32 and the outer bearing ring 20 there is provided a gap G that has to be hermetically sealed in order to prevent contaminants such as water, dust, mud, from entering the inner parts of the bearing and deteriorating the surfaces affected by the rolling of rolling elements 40. For this purpose, there is provided a sealing device 50, which is mounted on the outer bearing ring 20 and has a plurality of sealing lips extending towards the inner rotating ring 30, as described herein after.

The sealing device 50 comprises a metal insert 51 of annular shape which is fixed to an end portion of the outer ring 20 facing towards the flange 32, and an annular seal 52 of elastomeric material, integral with the metal insert 51, for example by vulcanization. The gasket 52 is illustrated in an undeformed condition.

The metal insert 51 overall has a substantially L-shaped axial cross-section, preferably obtained by folding and shearing a sheet steel element. The insert 51 includes a cylindrical portion 53, which is forcibly fixed with radial interference around a surface 22 of the cylindrical end portion of the outer ring 20, and a substantially radial portion 54, in the form of a shaped disk, which extends in a radially inner direction from an end portion 55 of cylindrical portion 53.

A radially outermost length 56 of the disk-shaped or radial portion 54 is arranged abutting against a radial surface 23 of the outer ring 20. A second, radially innermost portion 57, protrudes radially inwards beyond the outer ring 20 and extends towards the rotatable inner ring 30 of the hub bearing assembly.

The rotatable flanged ring 30 provides the raceway 31 and, adjacent thereto, an axial cylindrical surface 33, facing a radially outer direction. The cylindrical surface 33 is joined to a toroidal surface portion 34, arranged at the base of the flange 32 at the axially inner side. The toroidal surface 34 is joined to a radial surface portion 35, which extends radially or transversely with respect to the rotation axis x and is located at a radially outer position with respect to the toroidal surface portion 34.

The flange 32 forms an annular relief 36 protruding in axially inner direction and having a radially inner surface 37, of cylindrical or truncated cone shape, directed toward the axis of rotation x, in a radially inner direction. The cylindrical or frustoconical surface 37 is joined to a radial surface portion 38 which, in one embodiment, can be recessed with respect to the radial surface portion 35, thus providing an annular groove 39 facing the sealing device 50.

The annular relief 36 has an end surface 36a, substantially radial or transversal with respect to the rotation axis x, facing the axially inner parts of the bearing. Preferably, the end surface 36a forms a sharp edge 36b, of approximately 90°, with the cylindrical surface or a truncated cone 37.

Designated 41 is a radial surface portion formed by the axially inner side of the flange 32 at a radially outer position with respect to the annular relief 36. The latter is radiused to the radial surface 41 through a toroidal surface 42.

The gasket 52 has a first axial contacting lip 60 which extends axially from a radially inner end portion 58 of the seal and slidingly contacts the toroidal surface 34 or the radial surface 35 of the flange 32. A further, not contacting radial lip 66 extends from the radially inner end to the cylindrical surface 33.

A second, non-contacting axial lip 61 extends towards the flange 32 and has a free end portion 62 performing a contactless labyrinth seal with the flange 32. The free end portion 62 of the lip 61 has a preferably cylindrical or slightly truncated cone surface 63, extending axially and facing coaxially the surface 37 of the pad 36 from the inside, so as to cooperate with this surface to create a particularly efficient labyrinth seal.

In the illustrated embodiment, the free end portion 62 of the lip 61 is bifurcated, so as to form two protruding edges 64, 65 respectively extending in a radially outer direction and an axially outer direction. The first edge 64 of these two edges 64, 65 has the cylindrical or truncated cone 63 surface, the second edge 65 is facing the radial surface 38 of the recessed flange. Conveniently, the free end portion 62 of the lip is received in the annular groove 39 so as to optimize the effect of labyrinth seal.

The shape of the elongated coaxially facing surfaces 37 and 63 is advantageous in that it determines a meatus between these two surfaces a narrow cylindrical or truncated cone passage or gap 67 having an annular shape in cross section. The passage 67 is elongated in an axial direction, which enhances a labyrinth sealing action. The labyrinth seal is further accentuated by the fact that the free end portion 62 of the non-contacting axial lip 61 is at least partially accommodated in the annular groove 39. Thus, there is provided a winding path that renders the entry of contaminants (water, dust, mud) over the lip 61 particularly difficult.

When the inner ring 30 rotates relative to the outer ring 20, the toroidal shape of the surface 42 facilitates the expulsion of water even before it reaches the area of the lip 61. The contacting lip 60 provides an additional bather to contaminants. In addition, the non-contacting radial lip 66 defines two chambers 68 and 69, of which the first chamber 68 is inside the bearing and the second chamber 69 is bounded by two lips 60, 61 and surfaces 34, 35 of the flange 32. The two chambers 68, 69 can be filled with lubricating grease which may be a different type. The radial lip 66 prevents contact and mixing between the two different types of grease.

Figure 3:
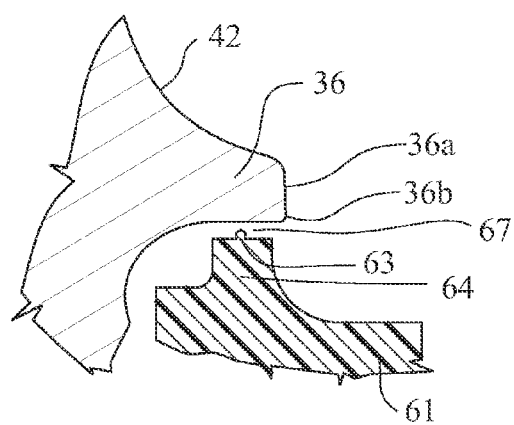
FIG. 3 is a view, in a further enlarged scale, of a detail of FIG. 2.

As shown in FIG. 3, the edge 36b is preferably arranged at an axially inner position relative to the surface 63, so that water and other contaminants will not fall in the gap 67. The surface 37 may be cylindrical or frustoconical. In case it is made frustoconical, it is preferable for the surface 37 to taper in the axially inner direction, so as to prevent water sliding along the surface 37 from penetrating into the gap 67.

The surfaces of the ring 30 and the flange 32 which are not affected by friction of the lips of the sealing device do not require a particularly high level of mechanical finish to minimize the surface roughness. The surfaces 34 and 35 of the flange are the only surfaces providing a rotating interface against which the sealing lips slide. For example, these surfaces may be subjected to a grinding treatment. The other surfaces of the flange 32, toward the axially inner side (or inboard side), do not require a particularly high degree of finish, as no sliding contact is exerted against them. Therefore, the surfaces of the groove 39, the pad 36 and the toroidal surface 41, can simply be turned instead of being be also ground. It will be appreciated that the assembly does not require a conventional shield constituting a rotating sliding counterface (known as slinger). This eliminates a component and the relative assembling and manufacturing costs.

Owing to the provision of a single contacting or sliding lip, the friction due to sliding is reduced to a minimum.

In the illustrated embodiment, the groove 39 is bounded by the cylindrical or truncated cone surface 37, the radial surface 38 recessed, and a surface 38a tapering in the axially inner direction, in order to increase the efficiency of the labyrinth seal. Preferably, the surfaces 37 and 38 are connected by a first, radial connecting surface 37a, and the surfaces 38 and 38a are connected by a second, radiused connecting surface 38b.

Figure 4:
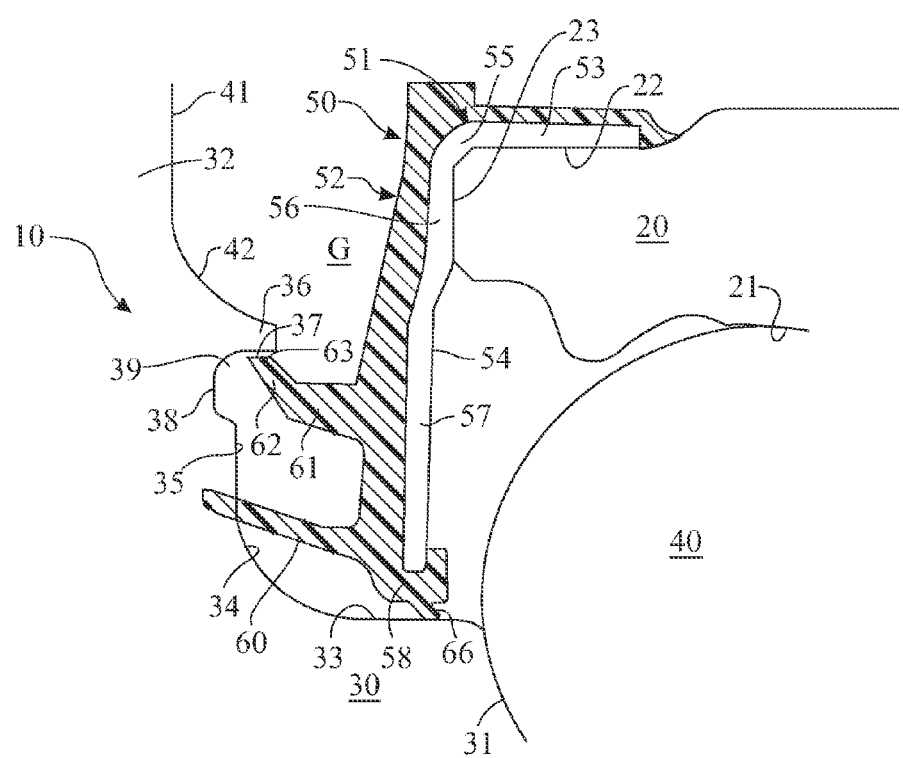
FIGS. 4 and 5 are partial views, in axial cross-section, of two further embodiments of a hub bearing assembly with a sealing device.

FIG. 4 shows an alternative embodiment, wherein the free end portion 62 of the lip 61 is not bifurcated, and forms a single edge providing the cylindrical or truncated cone surface 63 coaxially facing the surface 37 of the annular relief 36.

Figure 5:
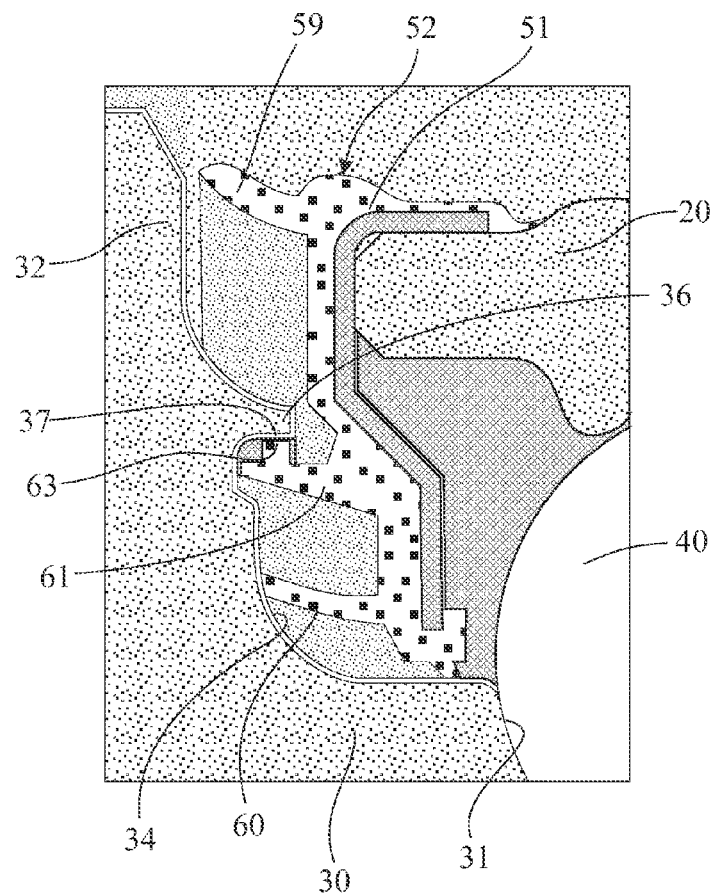

The invention is not limited to the particular geometry of the sealing device as shown in the figures. For example, as shown in FIG. 5, the elastomeric seal 52 may form a further non-contacting lip 59 which extends towards the flange 32 of the inner rotating member 30.

While a few exemplary embodiment have been disclosed in the foregoing detailed description, it should be noted that a vast number of variations may be arranged differently what has been illustrated. It should also be noted that the exemplary embodiments are only illustrative examples, and are not intended to limit the scope, applicability, or arrangement. Rather, the drawings and the preceding detailed description will provide those skilled in the art with a convenient guide for implementing the invention, it being understood that various changes may be made in the function and arrangement of the disclosed elements, without departing from the scope as set forth in the appended claims and their legal equivalents.

The invention claimed is:

1. A hub-bearing assembly for rotatably mounting a wheel to a vehicle, the assembly having an axis of rotation (x) and comprising:
   a radially outer, stationary bearing ring;
   a radially inner bearing ring, which is rotatable about the axis of rotation and provides a flange extending in a radially outer direction for mounting a wheel;

a plurality of rolling elements interposed between the outer and inner rings;

a sealing device, mounted to the outer ring and having a plurality of elastomeric sealing lips extending towards the inner ring; wherein the flange forms an annular relief projecting in an axially inner direction and providing a radially inner, cylindrical or frustoconical surface, facing the axis of rotation (x), and at least one of the elastomeric sealing lips of the sealing device is a non-contacting axial lip which extends axially towards the flange and provides a free end portion which performs a labyrinth seal, without contact, with the radially inner surface of the annular relief.

2. The hub-bearing assembly according to claim 1, wherein the free end portion is at least partially accommodated without contact in an annular groove which is formed in a surface of the flange, the surface facing in an axially inner direction and is bounded on a radially outer side, by the annular relief, and, on an axially outer side, by a recessed surface formed in the flange.

3. The hub-bearing assembly according to claim 2, wherein the inner ring forms a raceway adjacent to a base portion of the flange having a toroidal surface portion; wherein the recessed surface is formed in a radial surface portion which is located at a radially outer position of the toroidal surface portion, and wherein the recessed surface is located between the annular relief and the toroidal surface portion.

4. The hub-bearing assembly according to claim 3, wherein the sealing device further comprises a single elastomeric sealing contacting lip which slidingly contacts at least one of the toroidal surface portion or the radial surface portion, and wherein the surface portions are ground.

5. The hub-bearing assembly to claim 2, wherein the free end portion of the not contacting axial lip is bifurcated, so as to form two protruding edges, extending in a radially outer direction and in an axially outer direction, respectively, wherein a first of these two protruding edges provides the cylindrical or frustoconical surface, and wherein the second of the two protruding edges is facing the recessed radial surface of the flange.

6. The hub-bearing assembly according to claim 1, wherein the free end portion of the non-contacting axial lip provides an axially extending cylindrical or truncated cone surface coaxially within the radially inner, cylindrical or frustoconical surface of the relief, so as to form with the latter an axially elongate gap having an annular shape in a transversal cross-section, so as to perform a labyrinth seal.

7. The hub-bearing assembly according to claim 6, characterized in that the annular relief (36) protrudes in an axially inner direction beyond the cylindrical or frustoconical surface (63) of the non-contacting lip (61).

8. The hub-bearing assembly according to claim 1, wherein the annular relief provides an end surface, substantially transversal to the axis of rotation (x), the end surface being directed in an axially internal direction and forming a sharp edge of about 90° with the cylindrical or frustoconical surface.

9. The hub-bearing assembly according to claim 1, wherein the flange has a radial surface portion formed on an axially inner side of the flange at a radially outer position with respect to the annular relief and the annular relief adjoins the radial surface through a toroidal surface.

* * * * *